United States Patent [19]
Jorgensen

[11] 3,866,743
[45] Feb. 18, 1975

[54] HINGED METAL BELT CONVEYOR

[76] Inventor: Charles T. Jorgensen, 6046 Lake Worth Rd., Box 946, Lake Worth, Fla. 33460

[22] Filed: July 20, 1973

[21] Appl. No.: 381,215

[52] U.S. Cl. .............................................. 198/195
[51] Int. Cl. ............................................ B65g 15/30
[58] Field of Search ..................... 198/195, 196, 197

[56] References Cited
UNITED STATES PATENTS

| | | | |
|---|---|---|---|
| 2,428,507 | 10/1947 | Webb.................................. | 198/196 |
| 2,628,705 | 2/1953 | Kline et al. ........................ | 198/195 |
| 2,764,276 | 9/1956 | Ruppe............................. | 198/196 X |
| 2,987,167 | 6/1961 | Franz................................. | 198/195 |
| 3,233,722 | 2/1966 | Jorgensen .......................... | 198/196 |

FOREIGN PATENTS OR APPLICATIONS

| | | | |
|---|---|---|---|
| 286,589 | 1/1929 | Germany ........................... | 198/196 |

Primary Examiner—Evon C. Blunk
Assistant Examiner—Douglas D. Watts
Attorney, Agent, or Firm—Quarles & Brady

[57] ABSTRACT

A piano hinge type metal belt conveyor has hollow hinge rods connecting adjacent conveyor plate sections. Left and right hand roller chain assemblies each include a plurality of shafts each mounting sleeve bearings and rollers on the sleeve bearings. The shafts are interconnected by overlapping side wings each mounted at one end about one of the shafts and at its other end about the sleeve bearing on an adjacent shaft. Overlapping chain links disposed to the outside of the rollers may also be used to interconnect the shafts. In either case, the assembly of sleeve bearings, side wings, and rollers, plus chain links if used, is axially restrained on the shaft between a shoulder on the shaft and a cotter pin through the shaft. Each shaft has a projecting knurled end which is press fitted into the open end of a hollow hinge pin.

5 Claims, 5 Drawing Figures

HINGED METAL BELT CONVEYOR

BACKGROUND OF THE INVENTION

This invention relates to metal belt conveyors, and more particularly to an improved conveyor construction of the hinged apron type.

Metal belt conveyors are known in which formed steel aprons are hinged together at interdigitated hinge barrels or loops formed integral with both ends of each apron. Upstanding side wings may be welded to aprons to confine the material to be conveyed. Alternately, the side wings may form a portion of the roller chains which connect to each side of the aprons. The roller chains include a roller disposed at the center line of each apron hinge and link members complete the chain construction. The rollers travel over tracks to support the conveyor belt and its load, and the roller chains pass over a drive sprocket which drives the conveyor belt.

As shown in my earlier Pat. No. 3,233,722, issued Feb. 8, 1966, for Piano Type Conveyor Belt, it has been common to assemble such metal belt conveyors using a through hinge rod or shaft which not only extends through the interdigitated hinge loops but also projects beyond both sides of the connected aprons to function as the shaft for supporting the rollers and for mounting the chain links. In such a construction it is necessary when assemblying the complete belt conveyor to assemble all of the many parts of the aprons, side wings and roller chains at one time to build up a length of conveyor belt. However, such belt conveyors are normally offered with a variety of optional features such as different surface conditions for the flat portion of the apron (i.e. whether plain, perforated or pimpled), different types and sizes of rollers, and side wings of different heights. Thus, with the construction of my earlier patent, it is not economically feasible to stockpile preassembled belts to meet the potential needs of customers.

I have developed a construction for piano-hinge type metal belt conveyors in which the hinged aprons can be preassembled as one unit, and left and right roller chain lengths can be preassembled as separate units, so that lengths of these subassemblies can be stockpiled with the various optional features, and a fully assembled belt conveyor can be quickly made to a customer's particular specification.

SUMMARY OF THE INVENTION

The invention resides in a conveyor comprised of a metal apron conveyor belt assembly, and separate left and right hand roller chain assemblies; the belt assembly comprising a plurality of conveyor plate sections with hinge loops carried by the ends of the sections and with the loops of adjacent sections in transverse alignment, and a hollow hinge rod extending through said loops; each of the roller chain assemblies comprising a plurality of shafts each mounting a roller and connecting side wings, with each shaft including a projecting portion adapted to be fitted within an end of a respective hollow hinge rod and with means on said shafts for preventing the axial withdrawal of the rollers and side wings from said shaft.

It is a principal object of this invention to provide a metal belt conveyor which may be formed from three separate self-contained subassemblies.

It is another object of this invention to provide a metal belt conveyor of the piano-hinge type in which the roller chains can be preassembled as units separate from the metal aprons and can then be press fitted to an assembly of the metal aprons.

It is also an object of this invention to provide a metal belt conveyor in which the side wings can be preassembled with the roller chain and in which adjacent side wings are offset to provide overlapping portions with the leading edge of one side wing matching the line of offset of the preceding side wing under all movements from a normal path.

The foregoing and other objects and advantages of the invention will appear in the description which follows. In the description, reference is made to the accompanying drawings in which preferred embodiments of the invention are illustrated.

DETAILED DESCRIPTION OF THE PREFERRED EMBODIMENTS

Figure 1:
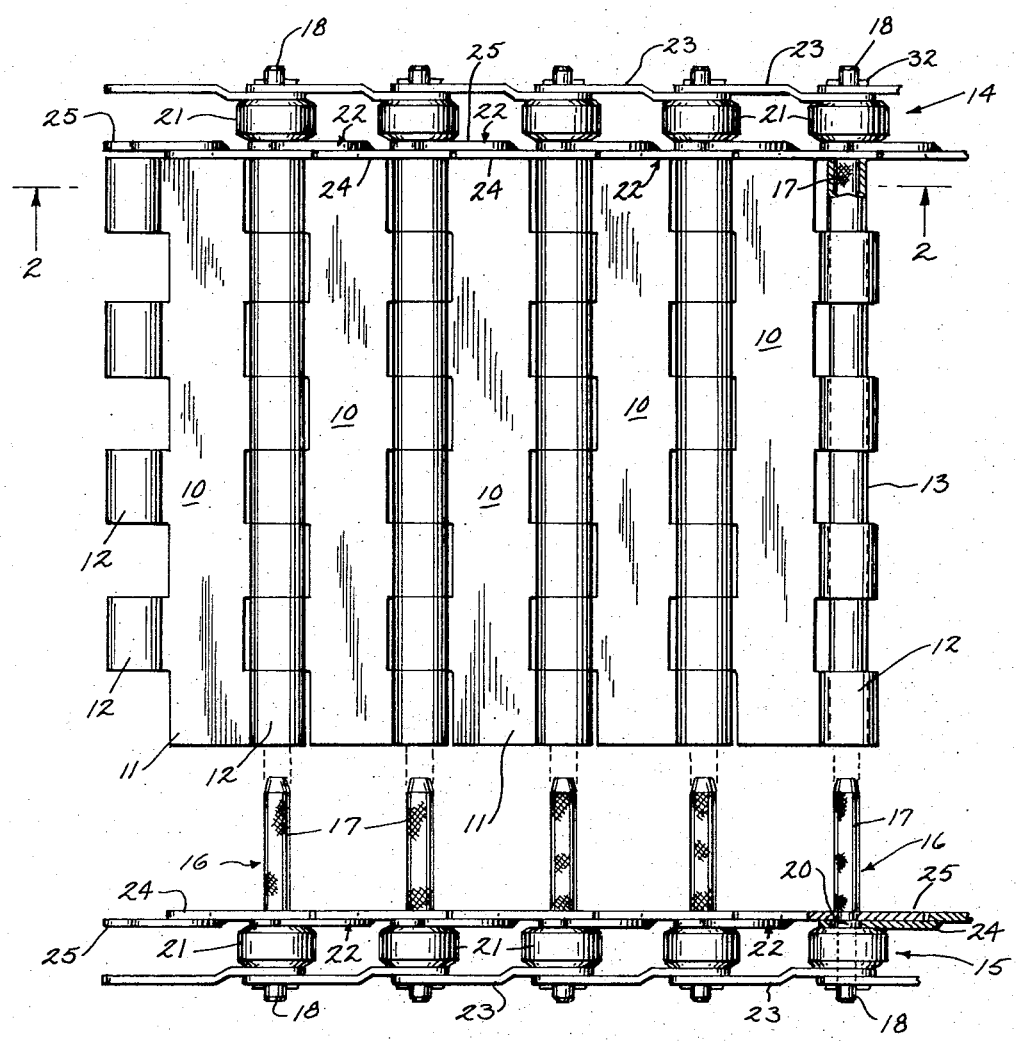
FIG. 1 is a top plan view of a length of conveyor belt in accordance with the invention and with one of the roller chain subassemblies shown disassembled from the remainder of the belt.

The conveyor includes a plurality of identical conveyor sections or aprons 10 which may be formed from any desired type of material or gauge of material suitable for the type of load to be carried by the conveyor. Each plate or apron 10 includes an elongated flat body 11 with staggered hinge barrels or loops 12 formed on the front and rear edge of each flat body 11. The staggered arrangement of the loops or barrels on the opposite edges of the aprons 10 permit them to be interdigitated with the loops or barrels 12 of the adjacent aprons 10, and a hollow hinge rod 13 is received in the transversely aligned barrels 12 of adjacent aprons 10. The hinge rods 13 do not project beyond the opposite side edges of the apron 10.

Figure 2:
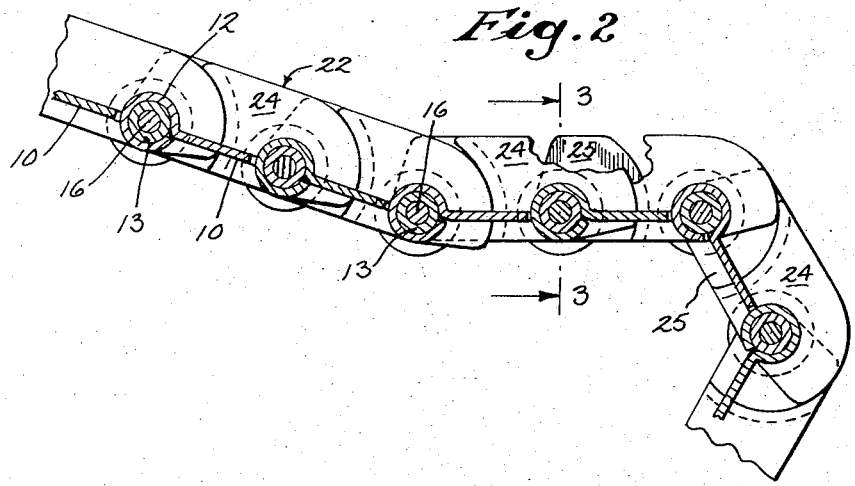
FIG. 2 is a view in section taken in the plane of the line 2—2 of FIG. 1 and illustrating the belt flexing to conform to inclines up and down from the horizontal.

In a known manner, the hinge barrels or loops 12 are formed by rolling back portions of the aprons 10, and the loops 12 extend a greater distance above the upper surface of the flat body 11 than they do below the lower surface of the flat body portions (see FIG. 2). As a result, the hinge axis for each adjacent pair of aprons 10 is above the midpoint of the apron 10 and each apron 10 thus forms a pan for carrying material.

Left and right hand roller chain assemblies 14 and 15, respectively, are adapted to be attached to either side of the assembled series of aprons 10. The roller chain assemblies 14 and 15 are in essence mirror images of each other and the description of one will suffice for the description of both. The roller chain assembly 14 includes a plurality of shafts 16 each having a tapered and knurled projecting portion 17 adapted to be press fitted within the open end of a hollow hinge rod 13. The shaft 16 also has a mounting portion 18 of reduced diameter which is separated from the projecting portion 17 by a shoulder 19. The mounting portion 18 of each shaft 16 mounts a brass sleeve bearing 20 and a roller 21 is mounted on the sleeve bearing 20.

Also mounted on the mounting portion 18 of each shaft 16 are the overlapping ends of adjacent pairs of identical side wings 22 and the overlapping ends of pairs of identical chain links 23. Specifically, each of the side wings 22 is formed of two flat plates 24 and 25. The forward plate 24 has a leading arcuate edge 26 which is an arc of a circle having its center at the center of a forward bore 27. The trailing edge 28 of the forward plate 24 has a matching arcuate shape described as an arc of a circle of slightly larger radius and with its center at the center of a rear bore 29 provided in the rear plate 25. The rear plate 25 overlaps the trailing arcuate edge 28 of the forward plate 24 and is spot welded thereto. Thus, when adjacent side wings 22 are placed together the leading edge 26 of one side wing 22 will be closely spaced from the trailing edge 28 of the preceding side wing 22, as shown in FIG. 2.

Figure 3:
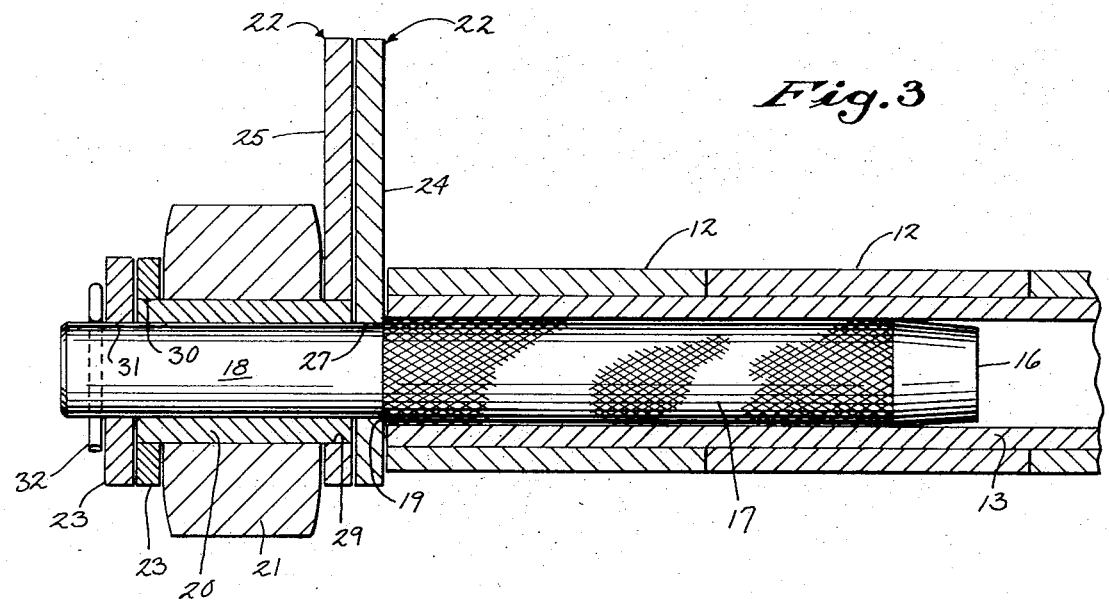
FIG. 3 is a view in vertical section, at an enlarged scale, and taken in the plane of the line 3—3 of FIG. 2.
Figure 5:
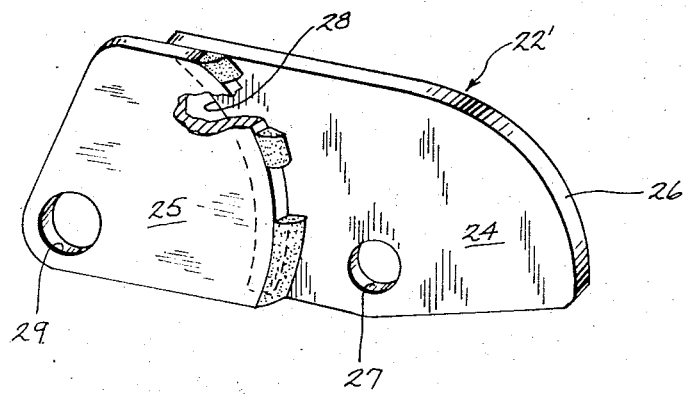
FIG. 5 is a view in perspective of a side wing for use in either of the embodiments of FIGS. 1 or 4.

As can be seen in FIGS. 3 and 5, the forward bore 27 and rear bore 29 in each side wing 22 have different diameters. The forward bore 27 has a diamter slightly larger than the diameter of the mounting portion 18 of a shaft 16 and the rear bore 29 has a diameter slightly larger than the outside diameter of the sleeve bearing 20.

The chain links 23 are identical and each is bent intermediate its ends to provide an offset equal at least to the thickness or gauge of the material of the chain links 23. One end of each chain link 23 has a large forward bore 30 adapted to be journaled on a sleeve bearing 20 and the other end of each chain link 23 has a small rear bore 31 adapted to be journaled on the mounting portion 18 of a shaft 16.

A roller chain assembly 14 or 15 can be assembled by first inserting the forward bore 27 of a side wing 22 over the mounting portion 18 of a shaft 16 and against the shoulder 19. A sleeve bearing 20 is then placed over the mounting portion 18 and the rear opening 29 of a second side wing 22 is slipped over the sleeve bearing 20. Thereafter, a roller 21 is placed upon the sleeve bearing 20 and a large bore 30 of one chain link is placed over the sleeve bearing 20. Then the small bore 31 of a second chain link 23 is placed about the mounting portion 18 of the shaft 16, and the assembly on the shaft 16 is then locked against removal by a cotter pin 32 extending through a hole in the outer end of the mounting portion 18. The roller chain assembly is continued by adding a shaft 16 and using the chain links 23 and side wings 22 attached to a previous shaft 16 and adding additional links and side wings until a length of chain assembly is completed.

As can be seen in FIg. 3, when the assembly of side wings, chain links, roller and sleeve bearings is completed upon a shaft 16, this assembly is axially restrained so that the assembled elements will not be able to be removed accidentally from the shaft 16. The forward plate 24 of one side wing 22 will be axially restrained by the shoulder 19, the sleeve bearing 20, and the outer chain link 23 which is held against axial removal by the cotter pin 32. The rear plate 25 of a second wing 22, the inner chain link 23, and the roller 21 will be axially restrained between the forward plate 24 of the one side wing 22 and the outer chain link 23.

The sleeve bearings 20 provide a low friction surface for rotation of the rollers 21 and for articulation of the side wings 22 and chain links 23 at each hinge point. As can be seen in FIG. 2, the conveyor can articulate upwardly or downwardly on the horizontal and, by the particular construction of the side wings 22, a substantially continuous flat surface is provided by the surfaces of the forward plates 24 which face the aprons 10.

Figure 4:
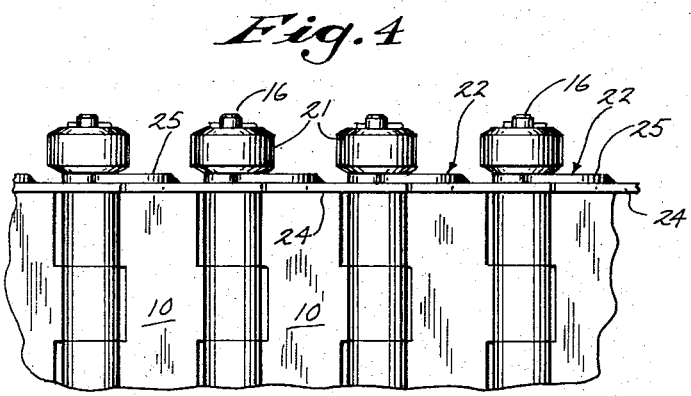
FIG. 4 is a partial top plan view of a conveyor belt in accordance with this invention and illustrating an alternate construction of the roller chain.

In FIG. 4 there is illustrated a modified form of my invention which is identical to the embodiment of FIG. 1 except that the chain links have been omitted. Such an embodiment may be used where the loads and stresses are such that it is not necessary to employ the chain links. The construction of FIG. 4 is otherwise identical to that previously described.

In accordance with my invention, subassemblies of a completed conveyor belt can be preformed and stocked. Thus, lengths of assembled aprons 10 with hollow hinge pins 13 in place can be stocked with the different lengths of aprons having different surface features such as plain, perforated, or pimpled, or provided with accessories such as upstanding cleats welded to their surface. Also, lengths of right and left hand roller chain subassemblies 14 and 15 can be preformed and stocked with the different lengths having different roller sizes or different heights of side walls 22. A completed conveyor belt can then easily be assembled to specification by the use of appropriate preassembled aprons and roller chains by simply press fitting the knurled projecting ends 17 of the shafts 16 into the open hollow ends of the hinge pins 13.

If desired, the outer ends of the mounting portions 18 of the shaft 16 could be permanently deformed after assembly to provide the axial restraint instead of using cotter pins 32. In that case, cotter pins or some other removable restraint could be provided on spaced ones of the shafts 16 so that a finished conveyor belt of a desired length could be made.

I claim:

1. A metal belt conveyor comprising:

a hinged apron belt assembly comprising a plurality of conveyor plate sections, hinge loops carried by the ends of said sections with the loops of adjacent sections in transverse alignment, and hollow hinge rods extending through said loops;

and left and right hand roller chain assemblies each comprised of a plurality of shafts each having a mounting portion, a projecting portion adapted to be inserted and held within the open end of one of said hinge rods, and a shoulder separating said mounting and projecting portions, said roller chain assemblies being joined to said belt assembly solely by the engagement of said projecting portions within the open ends of said hinge rods;

a side wing mounted on the mounting portion of each pair of adjacent shafts with adjacent side wings overlapping each other, a roller received on the mounting portion of each shaft, and restraining means disposed adjacent the end of each mounting portion opposite said shoulder, said restraining means cooperating with said shoulders to prevent axial withdrawal of the side wings and rollers from said mounting portions.

2. A metal belt conveyor in accordance with claim 1, wherein, a sleeve bearing is disposed about a part of the length of the mounting portion of each shaft and said roller is mounted upon said sleeve bearing, and said side wings each include forward and rear bores one of which is adapted to accommodate and to be journaled upon the mounting portion of said shafts and the other of which is adapted to accommodate and to be journaled upon said sleeve bearing.

3. A metal belt conveyor in accordance with claim 2, wherein said roller chain assemblies also include a chain link disposed on the mounting portions of each pair of adjacent shafts between the roller and restraining means, and with adjacent chain links overlapping each other, each of said chain links including forward and rear bores one of which is adapted to accommodate and to be journaled upon the sleeve bearing and the other of which is adapted to accommodate and to be journaled upon said mounting portion.

4. A metal belt conveyor comprising:

a hinged apron belt assembly including a plurality of conveyor plates each having hinge loops on its front and rear edges with the loops staggeredly arranged whereby loops of adjacent plate sections will interdigitate, and hollow hinge rods extending through said interdigitated loops;

and left and right hand roller chain assemblies each including a plurality of shafts each having a projecting portion adapted to be press fitted into the open end of one of said hinge rods, and a reduced diameter mounting portion, said roller chain assemblies being joined to said belt assembly solely by the engagement of said projecting portions within the open ends of said hinge rods;

a sleeve bearing disposed about a portion of the mounting portion of each shaft, a roller mounted on each sleeve bearing, a plurality of overlapping side wings each having a forward bore journaled on the mounting portion of one of said shafts adjacent said projecting portion and a rear bore journaled on the sleeve bearing of the following adjacent shaft, and restraining means disposed adjacent the end of the mounting portion of each shaft opposite said projecting portion, said restraining means cooperating with said larger diameter projecting portion to prevent axial withdrawal of the sleeve bearings, rollers and side wings from said mounting portions.

5. A metal belt conveyor in accordance with claim 4, wherein said roller chain assemblies also include a plurality of chain links each being offset intermediate its ends to provide portions which overlap with adjacent chain links, said chain links having a rear bore journaled on the mounting portion of one of said shafts between said sleeve bearing and said restraining means and a forward bore journaled on the sleeve bearing of the proceeding shaft between the roller and the adjacent chain link.

* * * * *